(12) United States Patent
Mathur et al.

(10) Patent No.: US 8,982,138 B2
(45) Date of Patent: Mar. 17, 2015

(54) FRAMEWORK TO INTEGRATE AND ABSTRACT PROCESSING OF MULTIPLE HARDWARE DOMAINS, DATA TYPES AND FORMAT

(71) Applicant: Avid Technology, Inc., Burlington, MA (US)

(72) Inventors: Shailendra Mathur, Beaconsfield (CA); Daniel Beaudry, Montreal (CA); Michel Eid, Ville Mont-Royal (CA); Mathieu Lamarre, Saint-Laurent (CA); Raymond H. Tice, Billerica, MA (US)

(73) Assignee: Avid Technology, Inc., Burlington, MA (US)

( * ) Notice: Subject to any disclaimer, the term of this patent is extended or adjusted under 35 U.S.C. 154(b) by 190 days.

(21) Appl. No.: 13/743,499

(22) Filed: Jan. 17, 2013

(65) Prior Publication Data

US 2013/0127883 A1    May 23, 2013

Related U.S. Application Data

(63) Continuation of application No. 12/420,371, filed on Apr. 8, 2009, now Pat. No. 8,358,313.

(60) Provisional application No. 61/123,463, filed on Apr. 8, 2008.

(51) Int. Cl.
*G06F 15/16* (2006.01)
*G06T 1/00* (2006.01)
*G06T 1/20* (2006.01)

(52) U.S. Cl.
CPC .... *G06T 1/00* (2013.01); *G06T 1/20* (2013.01)
USPC .......................................... 345/522; 345/502

(58) Field of Classification Search
CPC . G06F 9/5027; G06F 9/45508; G06F 9/5011; G06F 9/5044; G06F 5/024
USPC ......................................... 345/502, 533, 522
See application file for complete search history.

(56) References Cited

U.S. PATENT DOCUMENTS 5,774,126 A    6/1998 Chatterjee et al.
7,885,469 B2   2/2011 Wang et al.
(Continued)

OTHER PUBLICATIONS

Owens, J.D. et al, "A survey of general-purpose computation on graphics hardware", Computer Graphics Forum, vol. 26, No. 1, Mar. 1, 2007, pp. 80-113.

(Continued)

*Primary Examiner* — Hau Nguyen
(74) *Attorney, Agent, or Firm* — Oliver Strimpel

(57) ABSTRACT

A portable development and execution framework for processing media objects. The framework involves: accepting an instruction to perform a media processing function; accepting a media object to be associated with the media processing function; wrapping the media object with an attribute that specifies a type and format of the media object, and a hardware domain associated with the media object; and causing an execution domain to perform the media processing function on the media object. The instruction to perform the media processing function is expressed in a form that is independent of the hardware domain associated with the media object, and may also be independent of the type and format of the media object. The media object may be an image, and the media processing function may include an image processing function performed on a GPU.

33 Claims, 5 Drawing Sheets

(56) References Cited

U.S. PATENT DOCUMENTS

| | | | |
|---|---|---|---|
| 8,358,313 B2 | 1/2013 | Mathur et al. | |
| 2002/0184401 A1 | 12/2002 | Kadel et al. | |
| 2005/0140672 A1* | 6/2005 | Hubbell | 345/426 |
| 2008/0016491 A1 | 1/2008 | Doepke | |

OTHER PUBLICATIONS

Scherl, H. et al, "Design and implementation of the software architecture for a 3-D reconstruction system in medical imaging", Software Engineering, 2008 ACM/IEEE 30th Int'l Conf. on IEEE, May 10, 2008, pp. 661-668.

Seiler, L. et al, "Larrabee: A many-core x 86 architecture for visual computing", ACM Transactions on Graphics 20080801 Association for Computing Machinery US, vol. 27, No. 3, Aug. 1, 2008.

Thomas, D.B. et al, "Framework for development and distribution of hardware acceleration", Proceedings of the SPIE-INT., vol. 4867, 2002, pp. 48-59.

Apple Core Video Programming Fuide, Audio & video, Apr. 3, 2007, pp. 1-26.

RapidMind Applications for Multi-core, Apr. 8, 2008, http://web.archive.or/web/20080208121726/http://rapidmind.com, 2 pages.

* cited by examiner

FRAMEWORK TO INTEGRATE AND ABSTRACT PROCESSING OF MULTIPLE HARDWARE DOMAINS, DATA TYPES AND FORMAT

CROSS REFERENCE TO RELATED APPLICATIONS

This application claims right of priority to and the benefit of, under 35 U.S.C. §120, and is a continuation application of application Ser. No. 12/420,371, filed on Apr. 8, 2009, pending, which is a nonprovisional application claiming priority under 35 U.S.C. 119 to provisional application Ser. No. 61/123,463, filed on Apr. 8, 2008, both of which are incorporated herein by reference.

BACKGROUND

Post-production and image processing software applications can take advantage of custom hardware and, increasingly, of generic hardware in order to accelerate the processing of their video effects. Exploiting the processing speed-ups provided by newly introduced technologies becomes ever more important as the technical quality of cinematic and television content continues to improve. High definition home theatre systems with Blu-ray disc players have become a commodity, while digital cinema projection with 2K or even 4K line resolutions are gaining in popularity. This comes at the price of increased data processing requirements in the whole motion picture and broadcasting production pipeline. Image and video processing systems need to scale up their performance in order to handle such media.

Among the generic hardware available to media processing systems are various host CPU technologies, such as SSE2 for Intel-based platforms and Altivec for Apple Macintosh platforms, numerous graphics processing units (GPUs) commonly installed in off-the-shelf workstations, as well as other specialized hardware, such as Larrabee from Intel Corporation. The computer games market has helped make the GPU into a commodity. These GPUs have much more arithmetic processing power than equally priced central processing units (CPUs). GPUs make use of the inherent parallel nature of image rendering to outperform control-oriented CPUs, especially in gaming applications.

Image rendering for games and image processing applications involve similar processes. A developing research field, called general-purpose computing on GPU (GPGPU), explores techniques for using the GPU for a variety of problems including image processing. However, existing GPU-accelerated image processing systems are not easily programmed by developers using general purpose-programming languages such as C or C++. Current GPU-accelerated image processing systems require intricate knowledge of GPU components, the rendering pipeline, and rendering APIs.

There is also a general lack of GPU programming services that are directly targeted towards the needs of video processing on off-the-shelf platforms, operating systems, graphics cards and shader languages. Video processing requirements are primarily characterized by high bandwidth transfer requirements between host and GPU memory, and by other services that deal with the particular format and type of processing required for processing of video based visual effects.

The frequent introduction of new technologies greatly increases the complexity of software coding. In order to take advantage of the performance acceleration that the new technologies can provide, software needs to be intimately tied to the specific hardware type and model, the operating system, and the platform used. This means that in order to allow the same application to run optimally on different hardware and system configurations, multiple versions of the code are required.

The traditional approach to using newly introduced hardware is to develop individual low-level libraries specific to each new technology upon which the software is to run. These libraries are dedicated to and highly optimized for specific hardware and operating systems. They have their own protocol and particularities, and adopt a programming model that is often heavily influenced by the target hardware. This makes the application software difficult to maintain as the hardware evolves, and hinders rapid development of new software applications, such as new video effects. It prevents adoption of new hardware execution domains without the need for significant change in the client applications.

Once hardware-specific low-level libraries are developed, debugged and optimized, application developers and users seek to combine the strengths of these mature libraries. This is usually achieved by unifying some of the data structures and code of the various libraries. However, this can destabilize previously debugged software.

SUMMARY OF THE INVENTION

In general, the invention features an efficient portable, execution domain-agnostic framework to allow easier hosting, integration and expansion of low-level library capabilities and hardware execution domains, accessed through a standard common interface, without requiring modifications on the libraries themselves or to the client applications that provide features based on the low level libraries running on the new hardware.

In one aspect, the framework includes a portable, platform and operating system agnostic, component-based architecture (e.g., a component processing library) that provides a set of consistent interfaces on top of toolboxes that process plug-in media objects such as image rasters or graphics objects that are in plug-in formats and reside in plug-in hardware domains. The hardware domains include computer RAM, video RAM (VRAM), onboard GPU memory, and memory associated with custom hardware. The processing framework is referred to as CPL (Component Processing Library), and serves both as a framework for application software development as well as execution.

In another aspect, the invention features an image and video processing programming service that allows the transparent hosting and fast execution of GPU-based effects on a range of different platforms, operating systems, graphics cards and shader languages. The service taps into the GPUs customarily supplied as a component of current computer systems in order to perform accelerated image processing. Spatial, temporal and functional image processing acceleration is achieved using a framework in accordance with the invention. The framework also features the ability to specify pixel shading functions on a per-pixel basis that simultaneously utilizes as many of the pixel shaders present on the computer system as necessary and, when possible, exploits vector math accelerations based on details of the underlying program's algorithm.

In general, in another aspect, the invention features a media processing system comprising a plurality of execution domains and a memory associated one of the plurality of execution domains, wherein the memory comprises instructions readable by one of the plurality the execution domains, the instructions when executed on one of the plurality of execution domains, causes it to: accept an instruction to perform a media processing function; accept a media object to be associated with the media processing function, wherein the media object is wrapped with an attribute that specifies a type of the media object, a format of the media object, and a hardware domain associated with the media object; and cause at least one of the plurality of execution domains to perform the media processing function on the media object, wherein the instruction to perform the media processing function is expressed in a form that is independent of the hardware domain associated with the media object. Embodiments of the invention include one or more of the following features.

The instruction to perform the media processing function is expressed in a form that is independent of the media object type and/or of the media object format. The plurality of execution domains includes a CPU and a GPU and one of the plurality of execution domains is a CPU. The media processing function is an image effect and the type of the media object is a raster image. The image effect includes one of a dissolve, a color correction, insertion of text, and a motion effect. The media processing function is an image effect and the media object type is a graphics object. Each of the plurality of execution domains is associated with a low-level library of instructions, and at least a subset of a low-level library associated with one of the execution domains is incompatible with a corresponding subset of a low-level library associated with another one of the execution domains. The system identifies a mismatch between the media processing function and at least one of the media object type, media object format, and execution domain associated with the media object and eliminates the identified mismatch by either converting the type of the media object into another type, or converting the format of the media object into another format, or associating another hardware domain with the media object.

The media object attribute is one of a set of acceptable attributes, and the set of acceptable attributes can be augmented to include at least one of a new media object type, a new media object format, or a new associated hardware domain without the need to rewrite or recompile the instructions. The media object is split into portions that are sent sequentially over a data bus connecting the first execution domain to a second execution domain, and the media processing function is performed on one of the portions at a time. The instructions include a plurality of processing units and the media processing function is performed by executing at least a first one of the processing units, that calls a second one of the plurality of processing units. The instructions involve spawning from the called processing unit a thread that is executed asynchronously while the processing unit continues to perform the media processing function on the media object.

In general, in yet another aspect, the invention features a method of processing a media object that involves accepting an instruction to perform a media processing function, accepting the media object to be associated with the media processing function, wherein the media object is wrapped with an attribute that specifies a type of the media object, a format of the media object, and a hardware domain associated with the media object; and causing at least one of a plurality of execution domains to perform the media processing function on the media object, wherein the instruction to perform the media processing function is expressed in a form that is independent of the hardware domain associated with the media object.

In general, in a further aspect, the invention features an image processing system comprising: a central processing unit (CPU); a graphics processing unit (GPU); and a memory associated with the CPU, wherein the memory comprises instructions readable by the CPU, the instructions when executed on the CPU, causing the CPU to: accept an instruction to perform an image processing function; accept an image to be associated with the image processing function, wherein the image is wrapped with an attribute that specifies a format of the image and a hardware domain associated with the image; and cause the GPU to perform the image processing function on the image, wherein the instruction to perform the image processing function is expressed in a form that is independent of the hardware domain associated with the image.

In general, in another aspect, the invention features an image processing method comprising accepting from a client application running on a CPU an instruction to perform an image processing function; accepting from the client application an indication of an image to be associated with the image processing function; wrapping the image with an attribute that specifies a format of the image and a hardware domain associated with the image; and causing a GPU to perform the image processing function on the image, wherein the instruction to perform the image processing function is expressed in a form that is independent of the hardware domain associated with the image.

The method also includes one of more of the following features. The GPU has an associated shader language, and the instruction to perform the image processing function is expressed in a form that is independent of the shader language. Execution of the instructions is controlled by an operating system that runs on the CPU, and the instruction to perform the image processing function is expressed in a form that is independent of the operating system. The GPU includes an image rendering data buffer, wherein a type of the image rendering buffer is one of a texture, a frame buffer object, a multi-sample render buffer, a read only pixel buffer object, a write only pixel buffer object, and a read-write pixel buffer object, and the image is represented in a form that is independent of the type of the image rendering buffer. The GPU includes image rendering texture parameters that comprise at least one of color space, pixel depth and pixel range, and the image is represented in a form that is independent of the image rendering texture parameters. Causing the GPU to perform the image processing function on the image includes multiple pass execution, caching on the CPU a just-in-time compiled multi-pass pixel program, partially compiling the pixel program, and caching and retrieving the partially compiled pixel program. The CPU is associated with a memory, and the CPU allocates a portion of the memory to store image data, and causing the GPU to perform the image processing function on the image includes recycling the allocated portion of the memory without allocating a new portion of the memory to store the image. The image is represented as an 8-bit RGB color space image, an 8-bit YCC image, or an 8-bit YCCA image, and causing the GPU to perform the image processing function on the image includes packing the image into a BGRA texture. The instruction to perform the image processing function is expressed in a form that is independent of a color space, and/or pixel depth, and/or pixel range that is used to represent the image, and/or independent the memory layout and packing that is used to store the image. Causing the GPU to perform the image processing function on the image involves asynchronous execution of a processing thread on the GPU.

DETAILED DESCRIPTION

Figure 1:
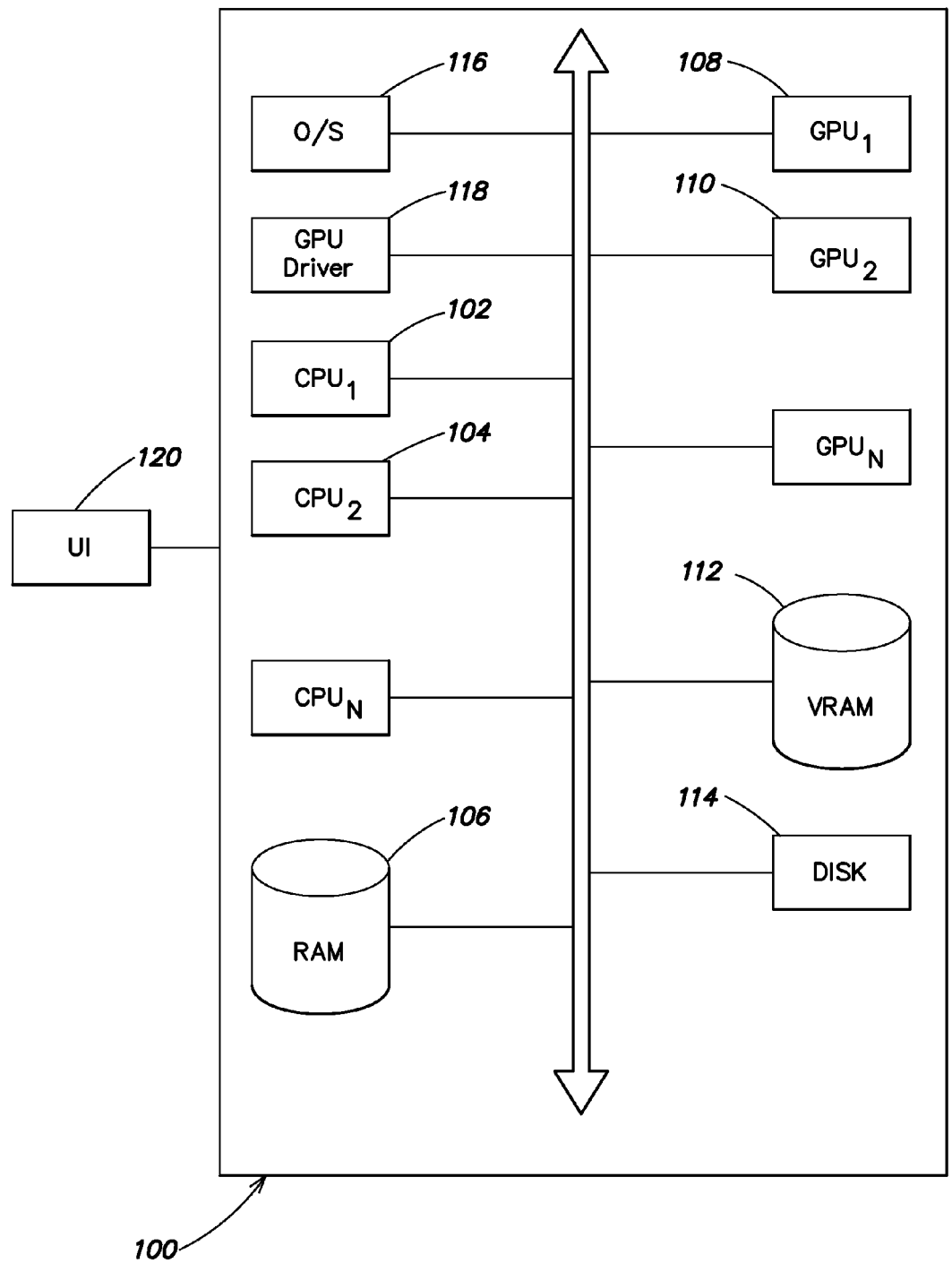
FIG. 1 is a block diagram of an example computing configuration for implementing a media processing system.

An exemplary computing configuration 100 within which the invention may be implemented is illustrated in FIG. 1. Computing configuration 100 is comprised of a plurality of electronic components found in general purpose computers and/or workstations. For example, computing configuration 100 may be comprised of: one or more central processing units (CPUs) 102, 104; random access memory accessible by CPUs 102, 104, denoted host memory or simply RAM 106; one or more graphical processing units (GPUs) 108,110; custom proprietary hardware and random access memory accessible by the GPU, denoted GPU memory or VRAM 112. The configuration may also include disk 114, (magnetic disk, solid state disk, or RAM-disk), as well as additional storage and processing elements.

Computing configuration 100 includes a multitasking operating system, O/S 116, and GPU driver 118. O/S 116 includes one of the common operating systems, including Microsoft Windows running on PC, Apple's OS/X on MacPPC/MacIntel, and Linux. O/S 116 hosts client programs, such as drivers, APIs such as high-level APIs OpenGL (for Mac and Linux) and DirectX (Microsoft), and applications such as media processing software, for example Avid Media Composer.

High-level APIs serve as a software layer over the GPU, allowing programs to send out specific processing and rendering jobs to it. The term "3D API" is used interchangeably with "high-level APIs" in this document. High-level APIs permit the 'pushing' of geometries, textures and shader programs onto the hardware, as well as allowing users to compile/expand their high-level shader language programs into the hardware-specific instruction sets that the hardware underneath can recognize.

Figure 2:
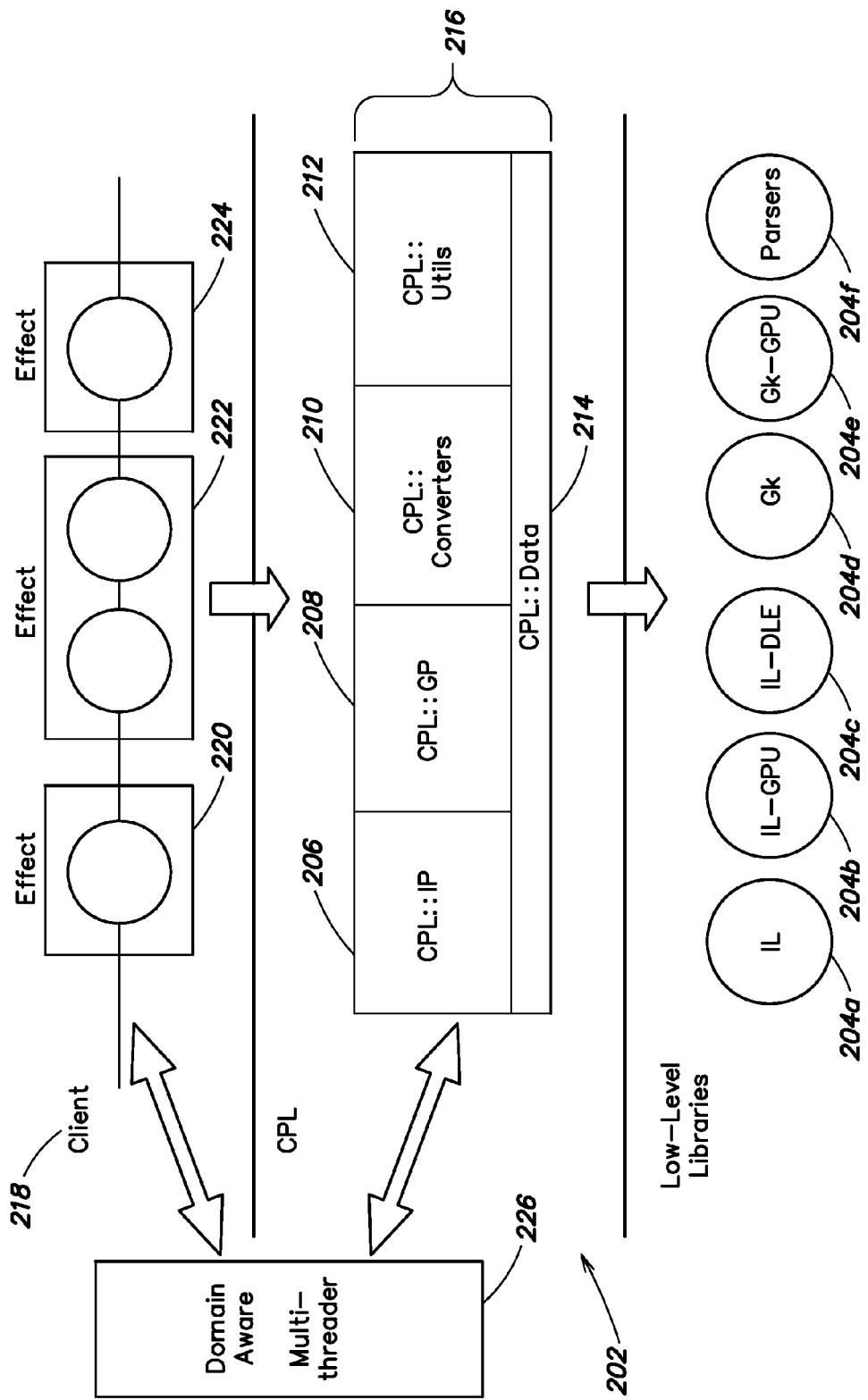
FIG. 2 is a diagram illustrating the software layers of a media processing system that incorporates a portable development and execution framework.

With reference to FIG. 2, the described embodiment features portable development and execution framework 202 comprised of an abstraction of hardware execution domains, data structure type and data structure formats of media objects. The abstraction provided is over a set of originally incompatible algorithms belonging to low-level libraries 204a-204f, each of which is specific to a particular hardware domain. Framework 202 permits an interaction between the various data domains, hardware execution domains, data types and formats through processing units, converters, and utilities implemented within CPL layer 216. CPL layer 216 includes image processing components 206, graphics processing components 208, converters 210, and utilities 212. Each of these processing components works with a common data object structure 214.

The componentized nature of development and execution framework 202 permits the expansion of the set of hosted media objects that can be processed. This allows a plug-in architecture for new media types, formats and hardware domains. It also expands the set of hosted algorithm implementations optimized to process the media objects in their native type, format or computation domain. The algorithms may be contained within external low-level libraries.

Portable development and execution framework 202 permits the hosting of the algorithms of existing low-level libraries 204a-204f without requiring modification of the libraries themselves. The low-level libraries 204a-204f may be unified so that their data and processing algorithms can be used in the same pipeline. Multithreaded utilization of the low-level library resources is achieved through a stateless class execution layer, reflected as CPL layer 216.

Portable development and execution framework 202 provides a standardized set of interfaces to set up, control and execute algorithms on data, regardless of the library implementation. It further provides a standard structure to handle all its parameters and properties making it easy to be used through a scripting system.

Portable development and execution framework 202 is invoked by client application layer 218. In the described embodiment, the client application includes a media processing application that includes applying effects 220, 222, and 224 to media objects. Upon execution of the client application, and particularly when an effect is required, the client application interfaces with framework 202 to invoke the resources of the available hardware domains. Framework 202 can determine which domain is appropriate for execution of a required algorithm on a particular media object. However, the client application permits a user to force the execution on a selected hardware domain. In addition, it also permits the re-use of its own processing units within other processing units in order to achieve the full encapsulation of complex pipelines.

The hardware domain abstraction provided by framework 202 bundles the processing functions of the domain with its associated storage and proprietary format. For example, the hardware domain can refer to the disk-based, RAM-based or GPU-memory based data buffers allocated to the media object, as well as to the execution code that recognizes where the buffers are allocated and is optimized to operate on data located in those domains.

We now describe the abstractions that are implemented within development and execution framework 202 in order to achieve the advantages of portability and low-level library independence referred to above. In the described embodiment, framework 202 is named the Component Processing Layer (CPL).

Data Abstraction

Within framework 202, media objects are provided with a wrapper, called component data (CData) that facilitates the data abstraction. In the described embodiment, the CData wrapper (referred to below simply as CData) allows the description of each specific data structure within the wrapper via a three-part attribute: data type, data format, and data domain. The data type describes the kind of data structure hosted by the CData. Examples of the data type include a raster image, a curve, a mesh, another type of parametric media object, audio, or text. The data format describes the format of the data structure hosted by the CData. For example, if the data type is a raster image, the data format includes formats that specify the spatial resolution, aspect ratio, color space, and temporal frame rate. If the data type is a curve, the data format includes formats that specify whether the curve is a linear, quadratic, or cubic curve. If the data type is audio, the formats include MP3, WAV, etc., and if the data type is text, the formats include HTML, Word, XML, and so on. The data domain indicates the primary hardware domain of the media object data, which may be the buffer allocated to it and/or the hardware that is to provide execution of processing functions on the media object. Examples of the data domain include a CPU, a GPU, a Cell processor, and a Larrabee GPU from Intel Corporation.

Each CData can be fitted with properties, referred to through a name (string). Each property has a specific type, such as scalars, string, data block or even another CData. Through the CData component, the user can manipulate the media object (i.e., low-level) data structure at a higher level because its implementation details are hidden behind the standard CData interface.

Processing Abstraction

Low-library operations and algorithms are hosted within framework 202's standard execution paradigm that features a thread-safe construct called a processing unit (PU). The parameters needed for an execution pass are handled through an object called the CContext object. The CContext is an object that holds the PU state information, including the input/output parameters, as well as the desired execution domain, data type and data format. In the described embodiment, client 218 creates and initializes a CContext in order to pass this state information to the PU via an interface, referred to herein as the PU FX interface, since in the described embodiment, the client application uses framework 202 to implement video effects (FX). However, the interface is not limited to video effects, and other functionalities can be called from the client application using the PU FX interface.

The processing abstraction includes external PUs and internal PUs. An external PU is used to logically bind together one or more internal PUs that implement hardware-specific algorithms found in the various low-level libraries. Each internal PU contains the low-level, library-specific code that implements the relevant operation for one or more CData attributes. For example, the blur operation might have two hardware-specific implementations found in two separate libraries, one for the CPU, the other for the GPU. The external PU handling the blur operation logically binds the two internal PUs, i.e., the PU that handles the CPU blur and the PU that handles the GPU blur. In other embodiments, instead of using a CData wrapper concept, the abstraction of media object data is performed by attaching media type, format and domain information to the media object in others ways that enable the portable framework to associate the media object with its attribute.

The external PU defines a standard set of parameters on the CContext that are needed to convey the given operations. Each internal PU is responsible for passing the standard parameter set, transmitted through the CContext, in a form suitable for the targeted low-level library. The internal PUs are implemented within the CPL layer 126, and perform the low-level library calls required to perform the task in accordance with the requested domain, data type and data format (i.e., the three-part CData attribute). The external PUs have a set of common standard interfaces used to control the various aspects of the execution of an operation, such as asynchronous execution, and a compiler interface to pass information about the hosted processing, etc. We describe PUs and their interaction with other components of media processing system 100 in connection with FIG. 3 below.

CPL framework 202 defines a single, unified coordinate (or reference) system for placing individual media objects. CPL media objects having position and size properties, or position, size and distance properties are positioned with respect to this unique coordinate system. The internal PUs convert position, size, and distance information from the CPL coordinate system to the specific low-level library (e.g., IL, Gk, . . .) coordinate systems.

An example of a full media processing system pipeline includes several external PUs that implement various operations, several CData that serve as inputs and/or outputs to external PUs, and several CContext used to store the parameters of the various executions.

In some instances, a PU is composed of multiple individual PUs, thus allowing more complex operations to be built from the existing framework. An interface is provided to extract the graph of individual operations within a PU, thus exposing to the CPL client a graph of the internal PUs. For example, a keyer effect is composed of multiple effects stages: pre-blur, keying, post-blur, grow-shrink, shape, and composite. CPL framework 202 defines single keyer PU that is used by client 218, with this PU including a graph of more granular PUs composed of a Blur PU feeding a Key PU feeding a Blur PU feeding a Growshrink PU feeding a Shape PU, finally feeding a Composite PU. A single client call to a Keyer PU performs this full pipeline of execution, which is easier for the application programmer to use as it reduces the number of effect calls required, and provides a higher level of abstraction. Making a graph of internally used PUs available to the client enables the client application, for example a media player, to negotiate the hardware resource required at the graph element PU level.

CPL framework enables the user to specify the execution domain via the CContext in order to force execution of a particular PU on a specific domain for a specific format and media type, provided that processing code for these three attributes is available.

To limit the contention on hardware domains that have large upload or download penalty, such as for a GPU, and, whenever possible for any particular CData attribute, the execution of a PU is sequenced. This sequencing is typically hardware domain specific and takes into account the parallelism and pipelining nature of the target hardware. The data may be tiled spatially or temporally. The inputs and outputs are automatically divided into smaller chunks by the CPL framework core, then are concurrently or sequentially uploaded to the hardware, fed to the PU and downloaded to be inserted in the input. This has the added benefit of allowing the PU to bypass hardware-specific limitations on data size.

An implementation of contention limiting and bypassing of hardware-specific limitations on data size proceeds as follows. In broad terms, a CPL execution pass starts with an upload of the data from the input domain to the execution domain, followed by a data processing stage on the execution domain, followed by a download from the execution domain to the target domain. The upload and download steps are absent if the input/output domain coincide with the execution domain. When uploading/downloading is required, there is a time penalty to be paid to transfer the data that varies with each domain. Depending on the nature of the processing, this latency period can be much larger than the time needed to process data residing on the domain. Without contention-limiting, the PU would: (1) start the upload of the whole input data set; (2) wait for the transfer to be completed; (3) start the processing; (4) wait for the processing to be completed; (5) start the download of the whole output data set; and (6) wait for the transfer to finish. By contrast, with contention-limiting, CPL accelerates this process by taking advantage of domains supporting concurrent transfers and execution by dividing the input and output data into smaller chunks that, because of their smaller size, are uploaded and downloaded faster than the whole data set. The execution sequence becomes: (1) start the upload chunk #1, and wait for completion of this operation; (2) start the processing of chunk #1, start the upload of chunk #2, and wait for completion of these two operations; (3) start the download of chunk #1, start the processing of chunk #2, start the upload of chunk #3, and wait for completion of these three operations (4) start the download of chunk #2, start the processing of chunk #3, start the download of chunk #4, wait for completion of these three operations; and (5) so on, until there are no more chunks to be processed. With the appropriate chunk size, the target domain hardware is continuously processing data, while its next data set is being uploaded and previous results are downloaded.

Thus the sequencing in CPL can result in two benefits. First, a system performance gain achieved by limiting the effect of upload/download latency on domains supporting concurrent transfers and execution. The only remaining idle time occurs when the first chunk is uploaded (and there is nothing to process yet) and when the last chunk is downloaded (and there is nothing to be processed anymore). Second, the ability to process input data sets that are too large to fit in the execution domains memory or exceed its current specifications since the resources taken on the target domain never exceed 3 chunks per CData parameter.

Conversion Abstraction

Converters are implemented as a set of special external PUs. They bind a set of internal PUs used to convert from one CData attribute to some other CData attribute. Conversions can be invoked explicitly by calling the external processing unit with the objects to convert, or implicitly when a CData of an unexpected attribute is given as input to an external PU. Whenever there is a mismatch, an automatic conversion is performed as required by the CPL framework core to ensure that the parameters given can always be understood by the PUs (lazy evaluation).

When a new attribute or a new PU is added to the CPL framework by a CPL developer, input and output converters for the existing attribute instances integrate the new processing units and new attributes to the currently existing set. This makes interoperability possible between the new attributes and processing units. For example, IL operates on data of the IDSImage kind that must be located in main (RAM) memory. IL-GPU operates on data formatted into IDSGPUImage kind that needs to be located in VRAM, which is the memory associated with a GPU. Converters automatically move data (a CPU raster, for example) from one domain (IL/CPU RAM/IDSImage, in our example) to another (ILGPU/GPU VRAM/IDSGPUImage, for example).

The parameters and properties found on the various objects are string-named, thereby permitting easy interfacing through a scripting engine.

Objects associated with CPL framework 202 are developed as individual components that require no external library linkage. The CPL protocol is implemented via an interface between PUs within framework 202 and low-level libraries that are specific to the various available execution and storage hardware domains. A CPL developer can add new low-level libraries to the set, new data types, new PUs as well as expand already existing PUs by adding new implementations without changing the client application that uses the CPL framework.

With reference again to FIG. 2, CPL layer 216 represents a middle layer between the client application 218 and the low-level libraries 204a-204f used for domain specific media processing. In the described embodiment, CPL layer 216 is comprised of: CPL data objects 214, the data objects used throughout development and execution framework 202, and CPL PUs which comprise a set of objects performing meaningful operations on the data objects, and which are the functional equivalent of function calls controlled by well defined interfaces. The CPL PUs include image processing units generically labeled as CPL::IP 206, graphics processing units generically labeled as CPL::GP 208, converters labeled as CPL::Converters 210, which implement domain, type and format conversions, and utilities labeled as CPL::Utils 212, such as display drivers.

Client application 218 does not require direct linking to any of the low-level libraries 204a-204f. A key feature of CPL framework 202 is that objects hosted within it are platform independent. The object adhere to a uniform component format (CF), with each component implemented as a CF plug-in. New objects or new domain implementations can be made available to clients by simply adding a new plug-in file into the appropriate folder on the computing system.

CP::Data objects 214 are used to uniquely represent data while abstracting the data's associated hardware domain, type (e.g., raster, parametric shapes), and format (which is bound to the object type and includes information about the quality of the data presented.) CPL::Data objects 214 serve as wrappers around any of the data objects defined in domain specific low-level libraries 102a-102f. Each of the CPL::IP 206 and CPL::GP 208 PUs accepts any appropriate CPL::Data object 214. Framework 202 allows for lazy evaluation using a proxy design pattern. For example, rasters are not created until pixels are requested, and are generated by means of concatenation operations.

Figure 3:
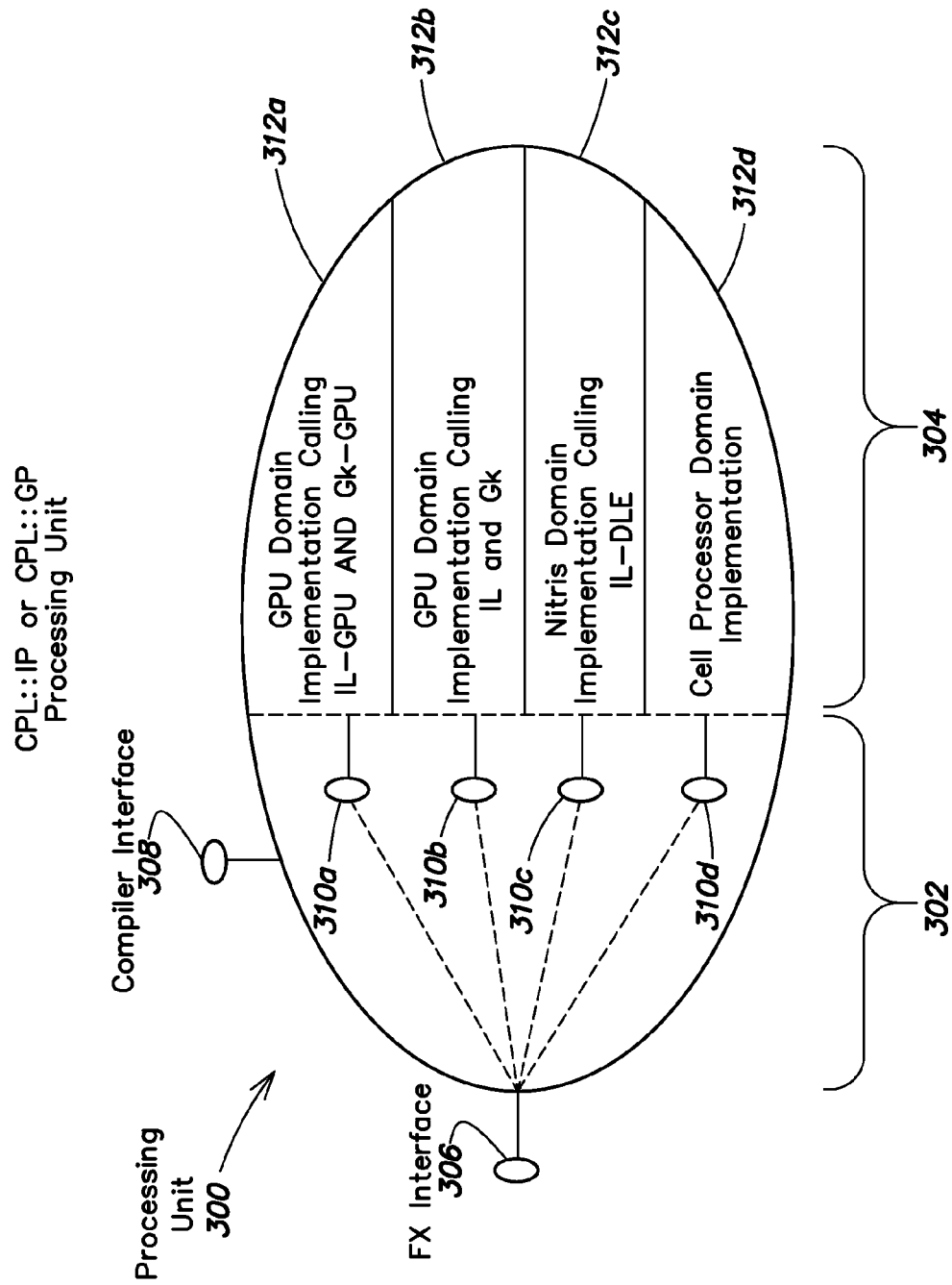
FIG. 3 is a diagram of a processing unit within a portable framework.

With reference to FIG. 3, an individual PU 300 is comprised of external PU 302 and several internal PUs 304. PU 300 is a member of the set of image PUs (CPL::IP 206) or graphics PUs (CPL::GP 208) from the CPL processing units and represents the processing objects that perform graphic and image processing on CPL::Data objects 124. PU 300 takes an arbitrary number of input CPL::Data objects (including zero for a source PU, such as a file reader PU), and produces an arbitrary number of output CPL::Data objects (including zero for a sink PU, such as a PU that generates an output display). PU 300 is a stateless object, storing its internal or contextual state in an execution context passed to it by the client. In the described embodiment, PU 300 exposes FX interface 306 and compiler interface 308. FX interface 306 interfaces with client application 218, which is, for example, a media player. Using FX interface 306, client application 218 invokes the one or more PUs required to execute a media processing function, such as a video effect (FX) using instructions that are independent of the specific type of the target media object, the format in which the target media object is represented/stored, or the hardware upon which the effect is to be executed.

In the described embodiment, FX interface 306 includes: (i) a specification of the input and output CPL::Data objects; (ii) specification of the input parameters; (iii) whether or not a specific execution domain is to be forced; and (iv) whether or not a specific execution type and format is to be forced, making use of available converters if needed. Other parameters can be specified instead of or in addition to these.

Compiler interface 308 enables PU 300 to query the capabilities available to it, including the supported execution domains, data object types and formats. It also queries the preferred execution domain, type, and format for that PU. With the information obtained via compiler interface 308, PU 300 can optimize the use of the hardware resources available to it, such as the host CPU, a GPU, or other hardware such as a custom graphics processing device such as a Cell processor or Larrabee GPU. The information supplied via the compiler interface also enables PU 300 to properly negotiate the way in which the data objects travel through sequential functional units of client application 218. For example, in the case of a media player application, PU 300 ensures the data objects can be passed through the various player nodes, such as codecs, effects, converters, and displays. In the described embodiment, the compiler resides in CPL layer 216.

PU 300 provides calls to low level libraries 204a-f via interfaces 310a-d to internal processing units 312a-d that call the domain-specific libraries. For example, GPU interface 310a interfaces external PU 302 with internal PU 312a that calls GPU 108 (referring to FIG. 1), and can invoke both the GPU image library IL-GPU 204b (referring to FIG. 2) and the GPU graphics library Gk-GPU 204e. Similarly, interface 310b interfaces external PU 302 with internal PU 312b that calls CPU image library IL 204a and the CPU graphics library Gk 204d. Other low-level interfaces are available to PU 300 depending on what additional domains are available to media processing system 100. For example, interface 310c between external PU 302 and internal PU 312c is available if the Avid Technology Nitris system is present, enabling PU 300 to interface with the Nitris image library IL-DLE 204c. Similarly, interface 310d would be available if a cell processor was present to enable external PU 302 to call internal PU 312d that can call a Cell processor. In addition, other interfaces would be available to allow PU 300 to interact with other domains, such as disk drives, via parser libraries 204f.

CPL::IP PUs 206 perform image processing operations, and primarily handle media objects that are raster images. Examples of CPL:IP PUs include color correction, blur, and shape based matte adjustment. CPL::GP PUs 208 perform geometry and other graphics operations, primarily handling media objects that are curves, surfaces, and volumes with parametric representations. Examples of CPL::GP PUs include the glyph generator and shape deformation.

The execution of a PU proceeds according to execution attributes that are based on the CData attribute, i.e., on the specified data domain, type and format. The execution attributes are either forced by client 218 or automatically determined by the PU itself. To force specific execution attributes, client 218 returns from the context the desired domain, type and format using an interface between client 218 and CPL layer 216. For example, client 218 or the PU can force synchronous execution of a PU, in which case the method is blocking, or asynchronous execution, in which case the method is non-blocking. To make the execution asynchronous, client 218 returns an "advise callback" via context object CContext.

For certain domains it may be necessary or advantageous to split an input media object into smaller chunks. For example, though the CPU has ample memory to process a whole raster media object at once, some GPUs may have more limited memories that cannot handle an entire raster. To overcome this issue, a tiled execution model is required. Development framework 202 provides an automatic tiling mechanism, hidden from the client, which tiles the input objects, feeds them to the PU and then recomposes the intended output from the output tiles. This mechanism is tailored according to the current hardware configuration and domain used.

The tiled execution model does not require multi-threading. However if a particular domain permits buffer transfers and execution to be performed in parallel, framework 202 will exploit this feature. Multi-threading by splitting and parallelizing the processing into smaller execution blocks is managed at the client level, rather than at the CPL framework level, as illustrated in FIG. 2 by multi-threader block 226. It is the client responsibility to call a PU in a multi-threaded manner. In some cases, region of interest and field masking functionality of the called PU can be invoked for this purpose. In order to do so, client application 218 is provided with access to multi-threader services that are CPL aware. These services determine how to multi-thread or pipeline a PU call based on the operation performed, domain and format used, as well as on additional directions provided by the client, such as the number of allowed parallel tasks, specification of a pool of threads, thread affinity and priority.

CPL::Converters 210 are specialized PUs taking as input a CPL::Data (Cdata object) having a three-part attribute (type, format, domain), and converting it to a specified output CData object with a different attribute. Converters 210 convert media objects from one type to another, from one format to another, and from one domain to another. In some instances, a converter PU converts more than one of the three components of a media object attribute in a single step rather than doing so sequentially. Type converters include rasterizers that convert parametrically defined graphics objects, such as curves, surfaces, and volumes to raster images, as used, for example, in scene renderers. Conversely, a "synthesizer" type converter can convert a raster image to a parametrically defined object, as, for example, in a magic-wand. Format converters include image format converters, for example converting a YCC image into an RGB image. One example of a domain converter converts a media object from being associated with the GPU to being associated with the CPU host. Converters 210 are integrated within CPL framework 202 rather than being implemented as a scattered set of utility routines.

CPL Utilities PUs 212 include primitive drawing tools, such as line tool LineTo( ) and rectangle tool Rect( ), as well as simple readers and writers from and to files. These PUs are utilized primarily for testing purposes.

The low-level libraries 102a-f comprise the low-level toolboxes that implement various domain and platform specific image and graphic processing. In the described embodiment, available low-level libraries include libraries to implement raster/image processing functions on CPU 102 (IL 204a), graphic processing on CPU 102 (Gk 204d), raster/image processing on GPU 108 (IL-GPU 204b), graphic processing on GPU 108 (Gk-GPU 204e), and processing of media objects located on or to be output to disk 118 (Parsers 204f).

Each low-level library is generally independent of the others. It is to be expected that there will be incompatibilities between the object types they contain, the level of abstraction they implement and their syntax.

We now describe in further detail an application of framework 202 that facilitates development and execution of accelerated image processing by using hardware developed primarily for graphics processing hardware domains, such as GPUs 108 and 110. The image processing functions involved service client application 218 that includes image processing functionality, such as a media player, editor, or image processing system. Using the concepts developed above, the described embodiment implements such accelerated image processing on one or more GPUs, referred to herein as GPGPU processing, for media objects having a CData type corresponding to a raster image or a graphics object, and an execution domain corresponding to a GPU. CPL layer 216 permits GPGPU abstraction over high-level image processing APIs, such as DirectX and OpenGL, or over any existing available technologies as the Pinnacle 3D-Server or the Apple Core Image library.

Figure 4:
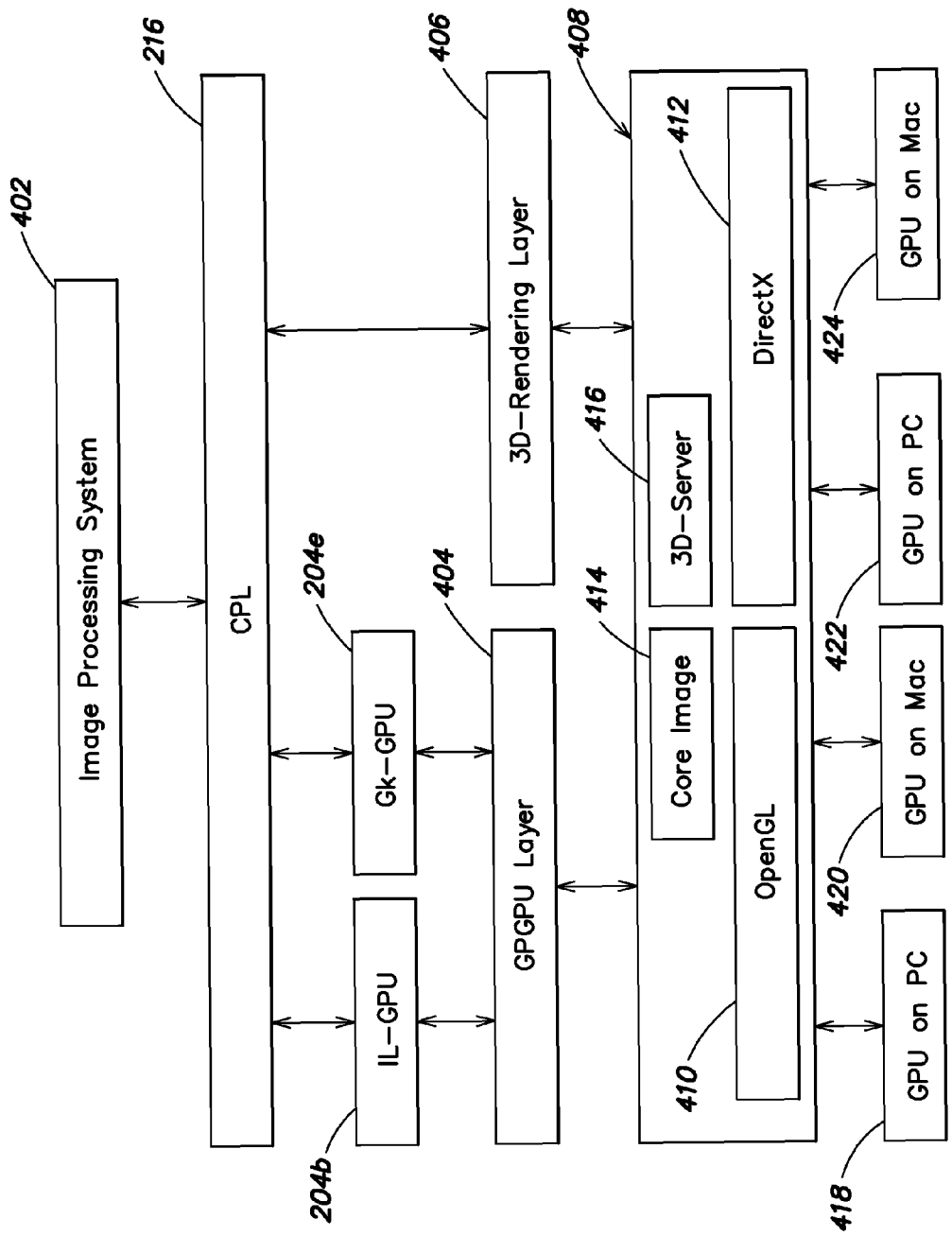
FIG. 4 is a block diagram of an image processing system incorporating a portable development and execution framework.

Referring to FIG. 4, CPL abstraction layer 216 implements client image processing system 402 on the GPU via GPGPU sublayer 404 and 3D rendering layer 406. GPGPU sublayer 404 facilitates using the GPU for pixel, vector and data processing. 3D rendering sublayer 406 abstracts the 3D API for rendering 3D scenes on the GPU. Layers 404 and 406 may be comprised of a subset of APIs 408 offered by OpenGL 410, DirectX 412, Core Image 414 and 3D-Server 416, as well as other proprietary or open APIs. In the illustrated embodiment, the low-level libraries are implemented on GPUs hosted by commercially available personal computer platforms, including a PC running a Windows operating system from Microsoft Corp., and (418, 422) and a Macintosh system running an operating system provided by Apple Inc., such as Mac OS X (420, 424).

As discussed above, framework 202 enables application software, including video effects 220, 222, and 224 (referred to in FIG. 2) to be independent of the choice of media processing system processing system 100, including CPU 102, operating system 116, and graphics hardware 108, 110. For performing GPGPU processing, framework 202 primarily uses GPU 108 as a pixel processing engine, implementing a subset of the raster low-level library and graphics low-level library on the GPU as IL-GPU 204*b* and Gk-GPU 204*e* respectively. Gk 3D rendering capabilities of the GPU may also be utilized, resulting in high-quality rendering involving lights and shadows.

Framework 202 also provides a GPU-accelerated image processing system that abstracts textures, frame buffer objects, multi-sample render buffers and read only/write only/read-write pixel buffer objects (i.e., many different image rendering data buffers) into a single image interface. In addition, framework 202 also abstracts image rendering texture parameters into a single image interface, including color space, pixel depth and pixel range.

In the described embodiment, the transfer of 8-bit textures is optimized. Natively and because of legacy issues, GPU drivers transfer 8-bit BGRA formats directly. All other 8-bit formats first undergo a conversion stage on the CPU to BGRA format before being transferred in the native fashion. In the described embodiment, the GPU driver is "fooled" into accepting other 8-bit texture formats, whether they be in RGB, YCC, or another format, as a native, BGRA texture. This allows bypassing of the slow CPU conversion stage. To access such image data that is transferred "as is" on the GPU, shader programs stored on the GPU use a small software layer that is made aware of the real source data format and unscrambles the various channels to their right position on the fly as they are accessed. Since this is performed on the GPU itself, it is executed much faster than with standard, built-in conversion methods that utilize the driver to handle the conversions. This transfer optimization only applies to 8-bit textures, as other larger formats, such as 16-bits, floating point, etc., are natively transferred in RGBA since these formats have been developed more recently and are not impacted by legacy implementations and conventions.

The GPU-accelerated image processing system is able to pack RGBA image data in an optimal format for host-to-GPU memory transfer and GPU processing. An optimal internal format for host to GPU transfers for 8-bit data is BGRA, while the optimal internal format for host to GPU transfers for all other data types is RGBA. In one embodiment, all 8-bit RGB color space images are packed into a BGRA texture. A pixel channel layout conversion layer wraps all pixel programs in such a way that these programs can access and write pixels as RGBA. The layer converts the read/write operations to access the right channel in the GPU texture.

In one embodiment, a GPU-accelerated image processing system packs YCC image data in an optimal format for host to GPU memory transfer and GPU processing in which the internal format for 8 bit data is BGRA, 8-bit YCC color space images are packed into BGRA textures, and the internal format for all other data types is RGBA. All other YCC color space images are packed into RGBA textures. A pixel color space conversion layer wraps the pixel programs in such a way that the programs can access and write pixels as RGBA data. CPL layer 216 converts the read/write operations to perform the color space conversions on the fly.

In another embodiment, a GPU-accelerated image processing system packs YCC images with separate alpha channel (YCCA) in the optimal format for host to GPU memory transfers and GPU processing using BGRA for 8 bit data is, packing all 8-bit YCCA color space images into BGRA textures, and, for all other data types, using is RGBA. Other YCCA color space images are packed into RGBA textures, while the packing of the alpha channel is performed by appending a rectangular region to the right side of the texture. In this way, YCCA images are stored in single texture, which is optimal for host to GPU transfer. Packing the alpha channel horizontally has the advantage of not wasting texture memory space and allows the spatial resolution of the alpha channel to be different from the spatial resolution of the chrominance channels.

The system may cache just-in-time compiled multi-pass pixel programs, with intelligent partial program compilation, caching, and retrieval on a per-pass basis.

The system may recycle each of the GPU data buffer types with a memory pool. The buffer types contained within the pool include textures of any format, read only/write only/read-write pixel buffer objects, frame buffer objects and multi-sample render buffers. Recycling GPU buffers is much faster than allocating and deallocating a buffers. When the system is performing video processing, the recycling of buffers has the added benefit of avoiding fragmentation of VRAM 112.

In another embodiment, the GPU-accelerated image processing system provides automatic handling of color space (RGB, YCC601, YCC709), pixel depth (8-bit, 16-bit, 32-bit, integer/float-signed/unsigned), pixel range (video levels, graphic levels, normalized float levels), and/or memory layout and packing (RGB, RGBA, BGRA, 422, 444, separate alpha, top-down/bottom-up.)

The GPU-accelerated image processing system may also provide automatic masking services to an algorithm including: processing pixel masking operations using a separate mask image, write field (odd/even lines) masking, processing channel masking (red-green-blue-and/or alpha) masking, and/or region-of-interest masking.

The system also achieves improved host to GPU memory and GPU to host memory transfers with multiple display configuration, and an easy to use pixel program to C++ function object binding mechanism.

In various embodiments, framework 202 provides the following data structures and functionalities to image processing application developers through user interface 120 connected to computing configuration 100: image functionality, permitting a developer to define and/or manage memory allocation and ownership (on the host or the GPU); interfaces to many kinds of GPU buffers, including textures, read-only pixel buffer objects, write-only pixel buffer objects, read-write pixel buffer objects, frame buffer objects, and multiple sample render buffer objects; color spaces, such as RGB, YCC601, and YCC709; pixel depths, such as 8-bit, 16-bit, 32-bit-integer/float-signed/unsigned; pixel ranges, such as video levels, graphic levels, and normalized float levels; and memory layout and packing, including RGB, RGBA, BGRA, 422, 444, separate alpha, and top-down/bottom-up. The framework also provides image pool functionality, permitting the developer to define and/or manage fast image recycling, including recycling buffers, which is faster than allocating and deallocating each buffer, and recycling of any of the GPU buffers in computing configuration 100.

Framework 202 can provide a C-like language in which pixel programs can be written, a base class to bind a pixel program to a simple C++ function object that supports algorithms having multiple inputs and outputs and that support source algorithms that have no input. The framework also features a library to hold C++ function objects for reuse and a pixel program cache facilitating just-in-time compilation of pixel programs, hashing and fast retrieval of already compiled program, multiple pass pixel programs, a pass being the execution of some pixel operation on part of or on the whole image, and just-in-time compilation and caching performed at the pass level in which the granularity of the cache is a single pass.

In various embodiments framework 202 also provides automatic masking of any processing operation, including processing pixel masking using an arbitrary mask image, write field masking (e.g., odd/even lines), processing channel masking (e.g., RGB and/or alpha masking), and region-of-interest masking. Also provided are optimized functions to transfer images from the host memory to the GPU memory and from the GPU memory to host memory and a window interface for real-time display of the framework images.

Within framework 202, a processing unit that uses a GPU can be made an active object. As such, a developer can create a program that calls this object to perform work in a non-blocking manner. The calling program can proceed with other tasks, retaining a future value, while execution proceeds within the processing unit. When the point of final synchronization occurs and the results need to be brought together, the future value can be accessed in a blocking manner and the data can be merged. The processing units have the capability of publishing their affinity with a particular kind of hardware, such as one of the GPUs 108, 110, or another domain, to help make the decision about which hardware should be used while dispatching a given unit of work.

A developer interfacing with the framework 202 can write a new image processing algorithm and integrate it in an existing application or reuse an existing image processing routine. Framework 202 obviates the need to write different versions of the new algorithm for each of the target hardware domains, data type, and data format. This reduces the time and cost required to add new functionality to client 218, and reduces debugging and compatibility issues.

Figure 5:
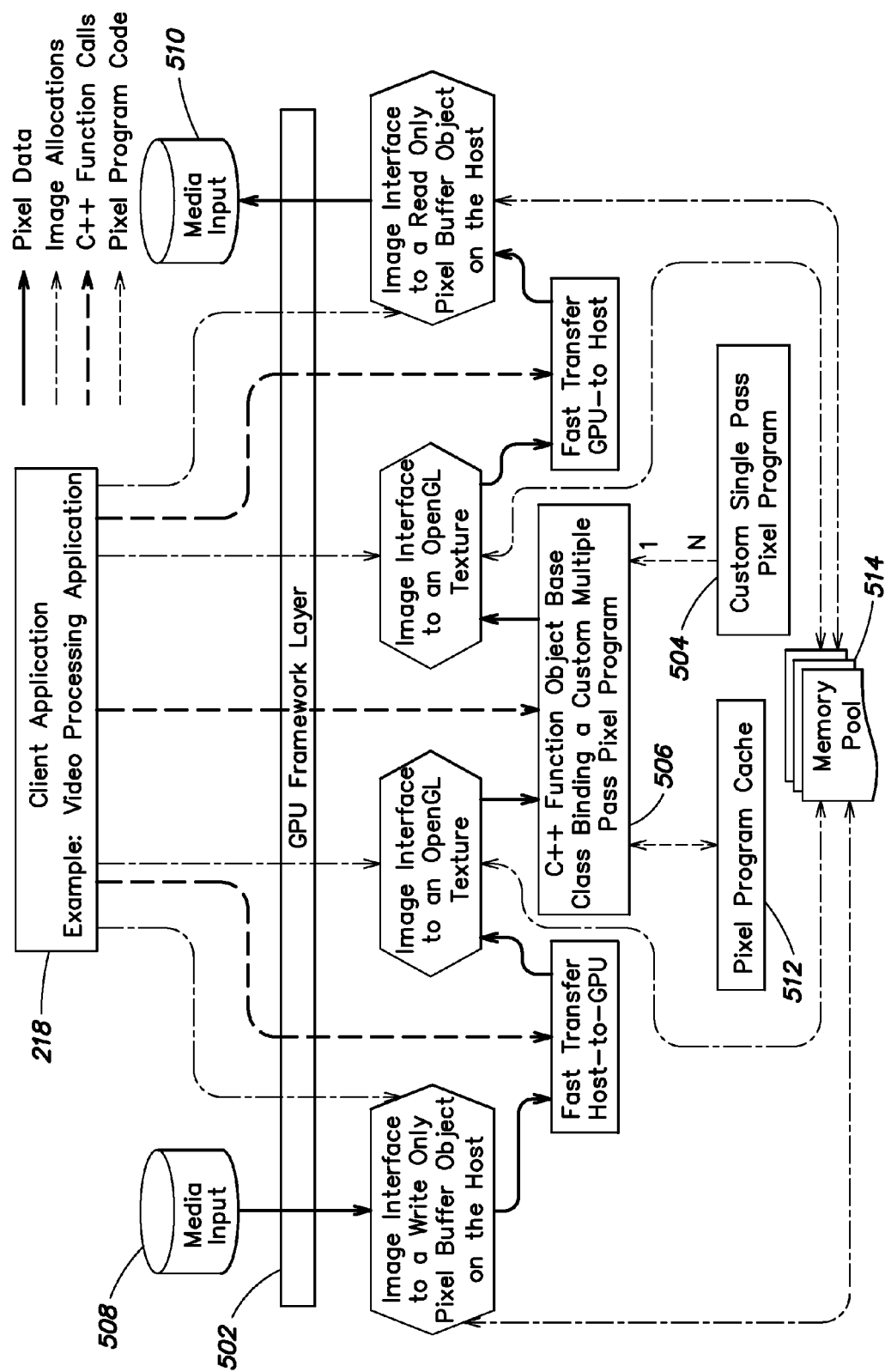
FIG. 5 is a flow diagram of an example video processing application using a portable development and execution framework.

FIG. 5 illustrates the flow of data and execution between client 218 and low-level library IL-GPU 204b via GPU framework layer 502. GPU framework layer 502 receives calls from PUs within CPL layer 216 when requests are issued to the GPU domain. More specifically, FIG. 5 shows the flow of pixel data, image allocations, C++ function calls, and pixel program code between the client application 218 and the interfaces and elements implemented within IL-GPU. The dark arrows show the flow of pixel data, the dash-dot arrows track memory allocations, and the bold dashed lines indicate the C++ function calls that are needed in order to accomplish a full operation with the IL-GPU, i.e., uploading data to the GPU, executing a program, and downloading the output to the CPU. The dotted lines indicate where the programs reside and where they are required for execution.

In order to implement a new image-processing algorithm for client application 218, a developer writes a separate pixel program 504 for each processing pass using a C-like shader language with compiler macros that abstract the differences between OpenGL GLSL and Direct3D HLSL. A new C++ function object class 506 is derived from the main pixel processor base class and implemented a single function that returns the pixel program code for each processing pass The main pixel processor base class accepts the client application parameters, including input images 508, output images 510, region of interest parameters, and masking parameters. At run-time the main pixel processor base class performs the following actions in a just-in-time fashion upon execution of the C++ function object that implements the new algorithm. (1) For each processing pass, it checks the pixel program cache 512 to see if the pixel program pass is already compiled and, if not: (a) it queries the code for each processing pass from the derived class implementing the new algorithm; (b) appends automatic conversion functions to the pixel program according to the input and output image pixel depth, pixel range, color space and memory layout, the conversion functions being hooks that are called in the new pixel program to read and write pixels in order for the compilation to succeed); (c) appends the automatic pixel masking operation to the pixel program according to the client application parameters; (d) sends the code to the OpenGL driver for pixel program compilation; and (e) stores the compiled program in pixel program cache 510. (2) It binds the input textures as source textures for rendering. (3) It also binds the output textures as OpenGL frame buffers (also known as render targets). (4) For each processing pass, it launches the rendering of one or many textured rectangle with OpenGL. The rendering is performed with the pixel program obtained in the previous step from the pixel program cache. The client application parameters for region of interest determine the size of the rectangle and of the OpenGL viewport.

The C++ function object that implements the new algorithm only accepts images that wrap OpenGL texture. Other functions provide for a means of converting regular images from the system's host memory to OpenGL texture in video memory.

The GPU runtime component (ILGPU 204b) provides the following services to be able to call the aforementioned C++ function object. (1) Memory allocation functions for the various types of buffers, including: (a) textures—used as input and output to the C++ function object; (b)
read-only pixel buffer objects—for fast GPU to host transfers; (c) write-only pixel buffer objects—for fast host to GPU transfers; (d) read-write pixel buffer objects—for versatile host buffers; (e) frame buffer objects—used by the framework in combination with the textures for output—not exposed to the client application; and (f) multiple sample render buffer objects—used by the framework for anti-aliasing—not exposed to the client application. (2) Image transfer and conversions in a single function of: (a) pixel depth, range, color space and memory layout; (b) write only pixel buffer object host memory to GPU texture memory transfer using optimal texture channel ordering that includes for 8-bit data ordering as BGRA, and for other data types ordering as RGBA; (c) GPU texture memory to read only pixel buffer object host memory; and (d) the various combinations of the memory allocation functions (described in point (1) above) provided by a single function, with conversion and transfer occurring at the same time. No rendering pass is required for pixel format that is natively supported by the GPU. A single rendering pass is automatically performed by the conversion function to carry out the actual conversion arithmetic processing on the GPU, which executes these operations much faster than the CPU.

Framework 502 provides memory pool 514 as a background service that is used by the allocation functions mentioned above. It works by hashing buffers by their size and type into two lists of used and ready-to-recycle buffers. Allocation functions retrieve buffers from the memory pool if a ready-to-recycle buffer is available. Deallocation functions append buffers to the ready-to-recycle list of buffers.

Memory pool 514 improves the performance of the allocation functions in video processing applications by the following techniques. Whenever appropriate, video processing application 218 reuses same sized images, enabling framework 502 to recycle the image buffer, thereby speeding up the allocations by about two orders of magnitude compared to the OpenGL standard allocation function. In addition, the memory pool also provides client application 218 with query functions to manage the video memory. Further, the memory pool alleviates memory fragmentation problems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A media processing system comprising:
   a plurality of hardware execution domains; and
   a memory associated with a first one of the plurality of hardware execution domains, wherein the memory comprises instructions readable by the first one of the plurality of hardware execution domains, the instructions when executed on the first one of the plurality of hardware execution domains, causing the first one of the plurality of hardware execution domains to:
      accept an instruction to perform a media processing function, wherein the instruction is expressed in a form that is independent of a hardware execution domain on which the media processing function is to be executed;
      accept a media object to be associated with the media processing function, wherein the media object is wrapped with an attribute that specifies a type of the media object, a format of the media object, and a data domain associated with the media object; and
      cause at least one of the plurality of hardware execution domains to perform the media processing function on the media object.

2. The media processing system of claim 1, wherein the instruction to perform the media processing function is expressed in a form that is independent of the media object type.

3. The media processing system of claim 1, wherein the instruction to perform the media processing function is expressed in a form that is independent of the media object format.

4. The media processing system of claim 1, wherein the plurality of hardware execution domains includes a central processing unit (CPU) and a graphics processing unit (GPU) and the first one of the plurality of hardware execution domains is a CPU.

5. The media processing system of claim 1, wherein the media processing function is an image effect and the type of the media object is a raster image.

6. The media processing system of claim 5, wherein the image effect includes one of a dissolve, a color correction, insertion of text, and a motion effect.

7. The media processing system of claim 1, wherein the media processing function is an image effect and the media object type is a graphics object.

8. The media processing system of claim 1, wherein each of the plurality of hardware execution domains is associated with a low-level library of instructions, and wherein at least a subset of a low-level library associated with one of the hardware execution domains is incompatible with a corresponding subset of a low-level library associated with another one of the plurality of hardware execution domains.

9. The media processing system of claim 1 further including instructions, that when executed on the first one of the plurality of hardware execution domains, cause the first hardware execution domain to:
   identify a mismatch between the media processing function and at least one of the media object type, media object format, and data domain associated with the media object; and
   eliminate the identified mismatch by either converting the type of the media object into another type, or converting the format of the media object into another format, or associating another data domain with the media object.

10. The media processing system of claim 1, wherein the attribute is one of a set of acceptable attributes, and wherein the set of acceptable attributes can be augmented to include a new attribute having least one of a new media object type, a new media object format, and a new associated data domain, and wherein the instruction to perform the media processing function can cause the media processing function to be performed on a media object wrapped in the new attribute without the need to rewrite or recompile the instruction.

11. The media processing system of claim 1 further including instructions, that when executed on the first one of the plurality of hardware execution domains, cause the first one of the plurality of hardware execution domains to split the media object into portions, send the portions sequentially over a data bus connecting the first execution domain to a second hardware execution domain, and perform the media processing function on one of the portions at a time.

12. The media processing system of claim 1, wherein the instruction to perform a media processing function comprises a plurality of processing units, and the media processing function is performed by executing at least a first one of the plurality of hardware processing units that, when executed on the first one of the plurality of hardware execution domains, calls a second one of the plurality of processing units.

13. The media processing system of claim 1, wherein the instruction to perform a media processing function comprises a plurality of processing units, and wherein performing the media processing function involves calling one of the plurality of processing units, spawning from the called processing unit a thread that is executed asynchronously while the called processing unit continues to perform the media processing function on the media object.

14. A method of processing a media object, the method comprising:
   accepting an instruction to perform a media processing function, wherein the instruction is expressed in a form that is independent of a hardware execution domain on which the media processing function is to be executed;
   accepting the media object to be associated with the media processing function, wherein the media object is wrapped with an attribute that specifies a type of the media object, a format of the media object, and a data domain associated with the media object; and
   causing at least one of a plurality of hardware execution domains to perform the media processing function on the media object.

15. The method of claim 14, wherein the instruction to perform the media processing function is expressed in a form that is independent of the media object type.

16. The method of claim 14, wherein the instruction to perform the media processing function is expressed in a form that is independent of the media object format.

17. The method of claim 14, wherein the plurality of hardware execution domains includes a central processing unit (CPU) and a graphics processing unit (GPU), and the first one of the plurality of execution domains is a CPU.

18. The method of claim 14, wherein the media processing function is an image effect and the media object type is a graphics object.

19. The method of claim 14 further comprising:
identifying a mismatch between the media processing function and at least one of the media object type, media object format, and data domain associated with the media object; and
eliminating the identified mismatch by either converting the type of the media object into another type, or converting the format of the media object into another format, or associating another data domain with the media object.

20. The method of claim 14, wherein the attribute is one of a set of acceptable attributes, and wherein the set of acceptable attributes can be augmented to include at least one of a new media object type, a new media object format, or a new associated data domain without the need to rewrite or recompile the instructions.

21. An image processing system comprising:
a central processing unit (CPU);
a graphics processing unit (GPU); and
a memory associated with the CPU, wherein the memory comprises instructions readable by the CPU, the instructions when executed on the CPU, causing the CPU to:
accept an instruction to perform an image processing function, wherein the instruction is expressed in a form that is independent of a hardware execution domain on which the image processing function is to be executed;
accept an image to be associated with the image processing function, wherein the image is wrapped with an attribute that specifies a format of the image and a data domain associated with the image; and
cause the GPU to perform the image processing function on the image.

22. The image processing system of claim 21, wherein the GPU has an associated shader language, and the instruction to perform the image processing function is expressed in a form that is independent of the shader language.

23. The image processing system of claim 21, wherein execution of the instructions is controlled by an operating system that runs on the CPU, and the instruction to perform the image processing function is expressed in a form that is independent of the operating system.

24. The image processing system of claim 21, wherein the GPU includes image rendering data buffers that comprise at least one of a texture, a frame buffer object, a multi-sample render buffer, a read only pixel buffer object, a write only pixel buffer object, and a read-write pixel buffer object, and the image is represented in a form that is independent of the image rendering buffers.

25. The image processing system of claim 21, wherein the GPU includes image rendering texture parameters that comprise at least one of color space, pixel depth and pixel range, and the image is represented in a form that is independent of the image rendering texture parameters.

26. The image processing system of claim 21, wherein causing the GPU to perform the image processing function on the image includes multiple pass execution, caching on the CPU a just-in-time compiled multi-pass pixel program, partially compiling the pixel program, and caching and retrieving the partially compiled pixel program.

27. The image processing system of claim 21, wherein the CPU allocates a portion of the memory to store image data, and wherein causing the GPU to perform the image processing function on the image includes recycling the allocated portion of the memory without allocating a new portion of the memory to store the image.

28. The image processing system of claim 21, wherein the image is represented as an 8-bit RGB color space image and wherein causing the GPU to perform the image processing function on the image includes packing the image into a BGRA texture.

29. The image processing system of claim 21, wherein the image is represented as an 8-bit YCC color space image and wherein causing the GPU to perform the image processing function on the image includes packing the image into a BGRA texture.

30. The image processing system of claim 21, wherein the image is represented as an 8-bit YCC color space image with separate alpha channel (YCCA) and wherein causing the GPU to perform the image processing function on the image includes packing the image into a BGRA texture.

31. The image processing system of claim 21, wherein the instruction to perform the image processing function is expressed in a form that is independent of at least one of a color space, a pixel depth, and a pixel range that is used to represent the image.

32. The image processing system of claim 21, wherein the instruction to perform the image processing function is expressed in a form that is independent of a memory layout and packing that is used to store the image.

33. An image processing method comprising:
accepting from a client application running on a CPU an instruction to perform an image processing function, wherein the instruction is expressed in a form that is independent of a hardware execution domain on which the image processing function is to be executed;
accepting from the client application an indication of an image to be associated with the image processing function;
wrapping the image with an attribute that specifies a format of the image and a data domain associated with the image; and
causing a GPU to perform the image processing function on the image.

* * * * *